United States Patent [19]
Yamaguchi

[11] Patent Number: 5,914,056
[45] Date of Patent: Jun. 22, 1999

[54] METHOD OF CONTROLLING A PRESSURE APPLICATION RESISTANT WELDING MACHINE

[75] Inventor: Teruzo Yamaguchi, Ayase, Japan

[73] Assignee: Obara Corporation, Tokyo, Japan

[21] Appl. No.: 08/902,718

[22] Filed: Jul. 30, 1997

[30] Foreign Application Priority Data

Sep. 30, 1996 [JP] Japan ..................................... 8-276865

[51] Int. Cl.⁶ ....................................................... B23K 11/11
[52] U.S. Cl. ............................................................. 219/86.41
[58] Field of Search ................................ 219/86.1, 86.25, 219/86.33, 86.41, 86.51, 86.61, 91.1, 91.2, 109, 110

[56] References Cited

U.S. PATENT DOCUMENTS

| | | | |
|---|---|---|---|
| 5,528,011 | 6/1996 | Kono et al. ........................... | 219/86.41 |
| 5,582,747 | 12/1996 | Sakai et al. ........................... | 219/86.41 |

FOREIGN PATENT DOCUMENTS

| | | |
|---|---|---|
| 0566741 | 10/1993 | European Pat. Off. . |
| 6-218554 | 8/1994 | Japan . |
| 6-312273 | 11/1994 | Japan . |

Primary Examiner—Gregory Mills
Attorney, Agent, or Firm—Flynn, Thiel, Boutell & Tanis, P.C.

[57] ABSTRACT

There is provided a method of controlling a pressure application resistant welding machine by setting in advance a danger region where a foreign matter is liable to be inserted, of reducing torque of an electric motor to an extent not to injure the foreign matter in the danger region so as to lessen a pressure applied to the foreign matter from the electrode, thereby performing a welding operation with safety and assurance. The method comprising steps of partitioning a moving region of the electrode into a safety region and a danger region, setting a range of the safety region to be substantially the same as a maximum thickness of a workpiece to be welded, setting a range of the danger region to be substantially the same as a thickness of a foreign matter to be inserted between the workpiece and the electrode, permitting a torque of an electric motor to generate a given pressure application force in the electrode in the safety region, permitting the torque of the electric motor in the danger region to be smaller than that in the safety region to an extent not to injure the foreign matter, recognizing the presence of the foreign matter in the danger region in response to an anomalous change of a current value of the electric motor to stop driving of the electric motor, and permitting the electrode to continuously perform a pressure application operation even if the current value of the electric motor is changed in the safety region.

3 Claims, 1 Drawing Sheet

METHOD OF CONTROLLING A PRESSURE APPLICATION RESISTANT WELDING MACHINE

BACKGROUND OF THE INVENTION

1. Field of the Invention

The present invention relates to a method of controlling a pressure application resistant welding machine capable of avoiding danger in case that a foreign matter such as fingers is inserted between an electrode and a workpiece when a movable arm of a welding gun such as a stud-gun, a C-type welding gun or an X-type welding gun reciprocates or performs a stroke for applying pressure (hereinafter referred to as a pressure application stroke) to the workpiece.

2. Prior Art

Attempts have been conventionally made to stop the driving of an electric motor by providing a sensor disposed at the periphery of an electrode for detecting a foreign matter which is present between the electrode and a workpiece during welding operation.

If the sensor is disposed at the periphery of the electrode, there arises a problem that the conventional system becomes complex and is deteriorated in workability because of troubles and restriction of use thereof, thereby substantially not performing the welding operation.

SUMMARY OF THE INVENTION

The present invention has been made in view of the problems of the prior art, and it is an object of the invention to provide a method of controlling a pressure application resistant welding machine comprising steps of setting a danger region in advance where a foreign matter is liable to be inserted, reducing torque of an electric motor to an extent not to injure the foreign matter in the danger region so as to lessen a pressure applied to the foreign matter from the electrode, thereby performing a welding operation with safety and certainty.

To achieve the above object, a method of controlling a pressure application resistant welding machine provided with an electrode at the tip end of a movable arm to be driven by an electric motor according to the first aspect of the invention comprises steps of partitioning a moving region of an electrode into a safety region and a danger region, setting a range of the safety region to be substantially the same as the maximum thickness of a workpiece to be welded, setting a range of the danger region to be substantially the same as a thickness of a foreign matter to be inserted between the workpiece and the electrode, permitting a torque of an electric motor to generate a given pressure application force in the electrode in the safety region, permitting the torque of the electric motor in the danger region to be smaller than that in the safety region to an extent not to injure the foreign matter, recognizing presence of the foreign matter in the danger region in response to an anomalous change of a current value of the electric motor to stop driving of the electric motor, and permitting the electrode to continuously perform a pressure application operation even if the current value of the electric motor is changed in the safety region.

The method of controlling a pressure application resistant welding machine of the second aspect of the invention is characterized in that the torque of the electric motor when the electrode performs a pressure application stroke in an early stage before entering the danger region is set to be the same or greater than that in the safety region.

The method of controlling a pressure application resistant welding machine of the third aspect of the invention is characterized in that the electrode moves intermittently in the danger region and the presence of the foreign matter is recognized by the torque of electric motor generated every pitch of the electrode.

PREFERRED EMBODIMENT OF THE INVENTION

Figure 1:
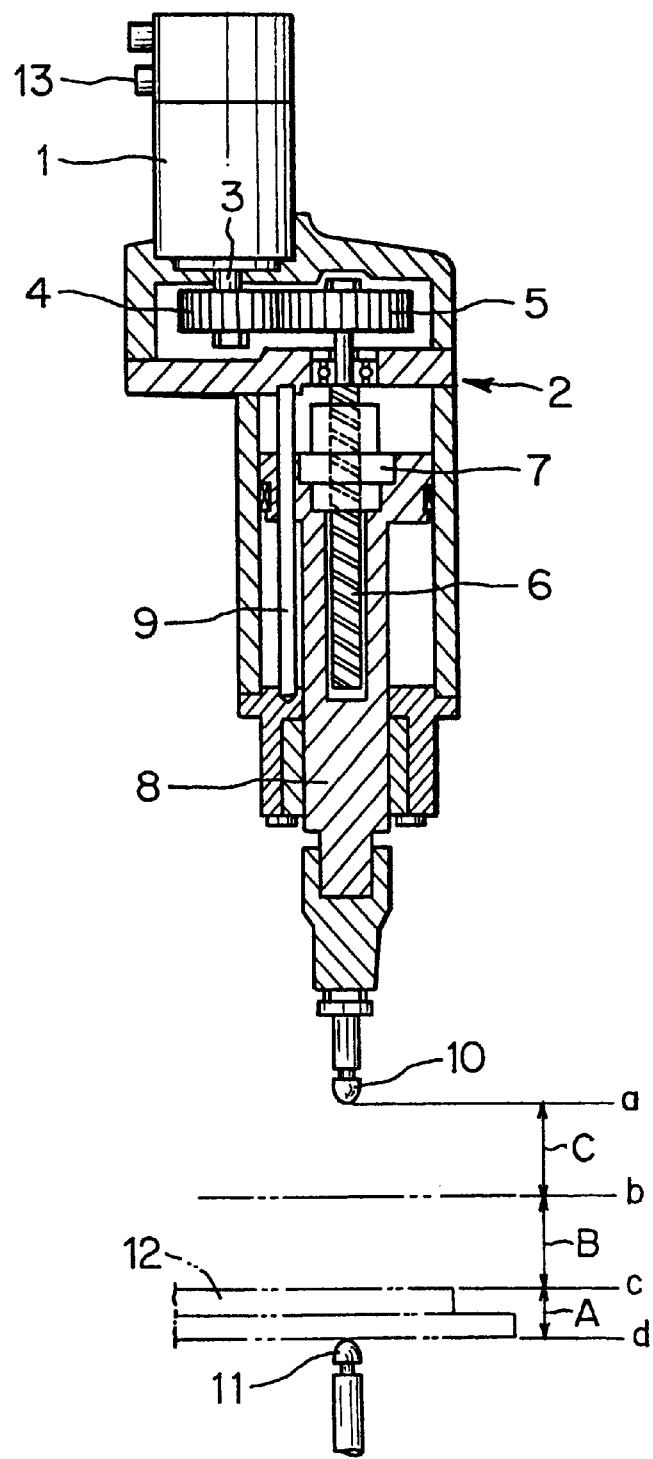
FIG. 1 is a schematic cross-sectional view of a stud-gun for explaining a method of controlling a pressure application resistant welding machine.

A preferred embodiment of the invention will be now described with reference to FIG. 1 which is a schematic cross-sectional view of a stud-gun for explaining a method of controlling a pressure application resistant welding machine.

The stud gun comprises an electric motor 1, a cylinder 2 for holding the electric motor 1 at the upper end thereof, a small gear 4 attached to an output shaft 3 of the electric motor 1, a large gear 5 meshing with the small gear 4, a screw shaft 6 attached to the large gear 5, a nut 7 meshing with the screw shaft 6, a movable arm 8 formed integrally with the nut 7 and a baffle 9 of the nut 7, wherein the small gear 4, large gear 5, screw shaft 6, nut 7 and baffle 9 are arranged inside the cylinder 2. An electrode 10 is attached to the tip end of the movable arm 8.

A workpiece 12 is disposed on another electrode 11. When the electric motor 1 is driven, the screw shaft 6 is rotated via the output shaft 3, small gear 4 and large gear 5. The rotation of the screw shaft 6 advances the movable arm 8 toward the workpiece 12 via the nut 7 so that the electrode 10 approaches to the workpiece 12. When the electrode 10 contacts the workpiece 12, the workpiece 12 is energized while it is pressed or in a pressure application state between the electrode 10 and another electrode 11, so that the welding operation is carried out.

When the foreign matter such as fingers is inserted between the workpiece 12 and electrode 10 during the performance of pressure application stroke, the fingers are exposed to jeopardy by being clamped between the workpiece 12 and electrode 10. Accordingly, it is necessary that the interval where the foreign matter is liable to be clamped is kept in a condition where the torque of the electric motor 1 remains low to secure safety.

Supposing that a position where the electrode 10 is open is denoted by a, a position of the another electrode 11 is d, a position corresponding to the maximum thickness of the workpiece 12 which can be welded by the welding machine is c, and a position corresponding to the thickness of the foreign matter which is insertable between the electrode 10 and the workpiece 12 is b, there is no possibility that the foreign matter is inserted between the positions c and d owing to the existence of the workpiece 12, and hence this interval or region between the positions c and d is set as a safety region A. Since there is a possibility that the foreign matter such as a small substance, fingers is inserted between the positions b and c, and hence this interval is set as a danger region B.

When the electric motor 1 is driven to permit the electrode 10 to approach the workpiece 12, the position of the electrode 10 is always detected by an encoder 13 or a timer, etc. so that the torque of the electric motor 1 is set depending on the position of the electrode 10, namely the torque in the safety region A is set to the extent that a given pressure application force P is applied to the workpiece 12 by the electrode 10, and the torque in the danger region B is smaller than that in the safety region A to the extent not to injure the foreign matter.

When the electric motor 1 is driven to permit the electrode 10 to approach the workpiece 12 under such conditions, the electrode 10 contacts the foreign matter or the workpiece 12, thereby changing the current value of the electric motor 1. If the change of the current value occurs in the danger region B, the driving of the electric motor 1 is stopped and at the same time the electric motor 1 is reversely rotated to release the pressure application against the foreign matter, thereby discharging the foreign matter. Since the pressure application force when the electrode 10 contacts the foreign matter is weak as set forth above, there is no likelihood of occurrence of danger even if the fingers or the like is exposed to jeopardy by being clamped between the electrode 10 and the workpiece 12.

Meanwhile, if the change of the current value occurs in the safety region A, it is judged that the electrode 10 contacts the workpiece 12 so that the driving of the electric motor 1 is continued to continuously perform the pressure application operation.

As mentioned above, since the torque of the electric motor 1 in the danger region B is smaller than that in the safety region A, even if the electrode 10 contacts the foreign matter, it can be discharged without specifically injuring the foreign matter. Since there is no foreign matter in the safety region A between the electrode 10 and workpiece 12, and the electrode 10 contacts the workpiece 12 alone, the pressure application operation continues so that the welding operation can be performed smoothly.

The electrode may be moved with low torque of the electric motor 1 in an early stage of the pressure application stroke before entering the danger region B, namely, in a region C between the positions a and b similarly to the danger region B. However, if the electric motor 1 is driven in the region C with the torque which is the same as or larger than that in the safety region A, the electrode 10 is speeded up, thereby enhancing the high efficiency. Further, since the region C is positioned away from the workpiece 12, the foreign matter is not clamped in the same region, and hence it is a safety spot.

Supposing that the electrode 10 is intermittently moved at a given speed or pitch ranging, e.g. from about 0.1 to 1 mm, and the current held by the electrode 10 is measured every pitch of the electrode 10 when the motor is stopped, an external force actually applied to the motor is calculated based on the thus measured current, and the electrode 10 is moved to the next pitch if the external force is less than a safe pressure application force, and the intermittent movement of the electrode 10 by the motor is interrupted if the external force is greater than the safe pressure application force.

According to this method, the position of the electrode 10 is recognized by the moving pitch of the electrode, and the weight of the movable part of the welding machine is not influenced by this control, thereby assuring the exact control.

Since the present invention is structured as such, the torque of the electric motor in the danger region is low and hence the foreign matter can be discharged without injuring it, even if the electrode contacts the foreign matter. Further, since there is no foreign matter in the safety region between the electrode and workpiece and the electrode contacts the workpiece alone, the pressure application operation continues so as to smoothly perform the welding operation.

Since the torque of the electric motor in the early stage of the pressure application stroke before entering the danger region B is set to be the same or greater than that in the safety region, the electrode is speeded up proportionally thereto, and hence the welding operation can be speeded up.

Since the electrode is intermittently moved in the danger region and the presence of the foreign matter will be recognized by the torque of the electric motor which is generated every pitch of the electrode, the position of the electrode is always recognized from the moving pitch of the electrode. Further, since the weight, etc. of the movable part of the welding machine is not influenced by the control, and hence the control can be more exactly performed.

What is claimed is:

1. A method of controlling a pressure application resistant welding machine provided with an electrode at the tip end of a movable arm to be driven by an electric motor comprising the steps of:

partitioning a moving region of the electrode into a safety region and a danger region;

setting a range of the safety region to be substantially the same as a maximum thickness of a workpiece to be welded;

setting a range of the danger region to be substantially the same as a thickness of a foreign matter to be inserted between the workpiece and the electrode;

permitting a torque of the electric motor to generate a given pressure application force in the electrode in the safety region;

permitting the torque of the electric motor in the danger region to be smaller than that in the safety region to an extent not to injure the foreign matter;

recognizing the presence of the foreign matter in the danger region in response to an anomalous change of a current value of the electric motor to stop driving of the electric motor; and permitting the electrode to continuously perform a pressure application operation even if the current value of the electric motor is changed in the safety region.

2. The method of controlling a pressure application resistant welding machine according to claim 1 wherein the torque of the electric motor when the electrode performs a pressure application stroke in an early stage before entering the danger region is set to be the same or greater than that in the safety region.

3. The method of controlling a pressure application resistant welding machine according to claim 1 wherein the electrode moves intermittently in the danger region and the presence of the foreign matter is recognized by the torque of electric motor generated every pitch of the electrode.

* * * * *